United States Patent
Gardner et al.

[11] Patent Number: 6,038,455
[45] Date of Patent: *Mar. 14, 2000

[54] REVERSE CHANNEL REUSE SCHEME IN A TIME SHARED CELLULAR COMMUNICATION SYSTEM

[75] Inventors: Steven H. Gardner; Sheldon L. Gilbert, both of San Diego; Carl Thomas Hardin; James E. Petranovich, both of Encinitas, all of Calif.

[73] Assignee: Cirrus Logic, Inc., Fremont, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/705,509

[22] Filed: Aug. 29, 1996

Related U.S. Application Data

[63] Continuation-in-part of application No. 08/533,664, Sep. 25, 1995, abandoned.

[51] Int. Cl.[7] .................... H04Q 7/20; H04J 3/00
[52] U.S. Cl. .................... 455/447; 455/450; 455/63; 370/337; 370/436
[58] Field of Search ............... 455/449, 450, 455/454, 446, 447, 448, 62, 63, 509, 513, 437, 524, 31.3; 370/436, 431, 442, 329, 330, 336, 337, 458, 280, 347, 278, 282

[56] References Cited

U.S. PATENT DOCUMENTS

| | | | |
|---|---|---|---|
| 4,408,496 | 10/1983 | Ritz et al. | 375/202 |
| 5,228,029 | 7/1993 | Kotzin | 370/337 |
| 5,257,398 | 10/1993 | Schaeffer | 455/33.1 |
| 5,301,188 | 4/1994 | Kotzin et al. | 455/447 |
| 5,448,753 | 9/1995 | Ahl et al. | 455/33.1 |
| 5,485,463 | 1/1996 | Godoroja | 370/95.1 |
| 5,594,720 | 1/1997 | Papadopoulos et al. | 370/337 |
| 5,774,790 | 6/1998 | Dupuy | 370/337 |

OTHER PUBLICATIONS

*The Future of Paging*, by Karl Weiss, presented at the Center for Wireless Communications, University of Singapore.
*Cellular Efficiency with Slow Frequency Hopping: Analysis of the Digital SFH900 Mobile System*; by Dornstetter and Verhulst; IEEE Journal on Selected Areas in Communications vol. SAC–5, No. 5, Jun. 1987.

*Primary Examiner*—Reinhard J. Eisenzopf
*Assistant Examiner*—Lester G. Kincaid
*Attorney, Agent, or Firm*—Stephen Shaw; Marty Jaquez

[57] ABSTRACT

A time sharing method and apparatus for frequency reuse in cellular communication systems. Frequency reuse is enhanced by synchronizing cell transmit/receive base stations in a cellular system to a common time base, and then sharing the available frequencies via allocated time slots. Cells using the same frequency that may interfere with each other are activated only during selected time intervals while same-frequency cells nearby are deactivated. The deactivated cells are then in turn activated while previously activated same-frequency cells nearby are deactivated. The frequency time slots may be of equal length, or longer time slots may be allocated to cells having higher usage rates, as determined in any of a number of ways. The time slots may be mutually exclusive, or may overlap. The time sharing technique of the present invention allows design of cell systems with many reuse patterns. Several particular cell reuse patterns are disclosed that provide good operational characteristics and low co-channel interference. The invention allows the use of a small number of cellular frequencies in a conventional cellular system without significant alteration of the existing system, and is particularly useful in two-way cellular paging systems. Improved reverse link data throughput is achieved via reuse of the reverse frequency channels.

15 Claims, 9 Drawing Sheets

REVERSE CHANNEL REUSE SCHEME IN A TIME SHARED CELLULAR COMMUNICATION SYSTEM

CROSS REFERENCE TO RELATED APPLICATION

This is a continuation-in-part of Ser. No. 08/533,664, filed Sep. 25, 1995, now abandoned, entitled "Timesharing Method and Apparatus for Frequency Reuse in Cellular Communication Systems."

BACKGROUND OF THE INVENTION

1. Field of the Invention

This invention relates to wireless communications systems, and more particularly to cellular communication systems.

2. Description of Related Art

In cellular communication systems, geographic areas or regions are typically divided into cells that are nominally hexagonally shaped. Each cell is allocated one or more radio frequency channels. In a frequency division multiple access (FDMA) system, adjacent or nearby cells are assigned separate frequencies. (The techniques described herein are primarily intended for use in FDMA systems, but may be used in time division multiple access (TDMA) or code division multiple access (CDMA) systems as well). After all available frequencies have been allocated, it is necessary to begin reusing the frequencies. For example, if seven frequencies are available, it is necessary to begin using the first frequency again starting in the eighth cell.

FIG. 1 is a block diagram of a prior art cell configuration showing a problem of frequency reuse. Clusters of seven cells (modeled as hexagons for ease of understanding) form frequency reuse groups or cell groups 1, indicated by bold lines. Seven frequencies are used within each cell group 1, and then reused in adjacent cell groups 1. Within each cell group 1, the pattern of frequency distribution is normally the same. Thus, the center cell 2a of the central cell group 1 a shown uses the same frequency as the center cell 2b of the adjacent cell group 1b.

Because frequencies are reused, two cells operating on the same frequency, though separated geographically, may interfere with each other. This is known as "co-channel interference". The effect of co-channel interference varies with terrain and distance. In cases where path loss conditions favor the desired signal, the co-channel interference may not be strong enough to have a significant impact on receiver performance. In other cases, path loss conditions may cause the difference between the desired carrier power and the interference (known as the "C/I" ratio) to be insufficient for good receiver performance. In many systems this occurs when the C/I ratio is below about 16–17 dB (generally indicative of significant co-channel interference), although the acceptable C/I ratio may be more or less, depending on the nature of the signal and the channel. The overall effect is to create areas within a cell where no good coverage is possible. In a case of seven total frequencies, these bad locations may comprise 40% or more of a typical cell.

The traditional way to mitigate co-channel interference in FDMA systems is to allocate a larger number of frequencies to the service and to devise sparse reuse patterns. A common allocation is a reuse factor of 21 (7 cells with three 120° sectors per cell). However, this method cannot be used when only a small number of frequencies, such as seven, are available.

Recently, the Federal Communications Committee auctioned licenses for frequency spectrum intended for providing improved personal communications services such as two-way paging. These systems are commonly referred to as narrowband Personal Communications Systems, or NPCS. NPCS creates the opportunity for development of a new class of messaging services and instrumentality having improved efficiency and greater functionality in comparison with prior art messaging or paging systems. Two classes of licenses for NPCS are presently available. A first class, referred to hereinafter as "symmetrical" NPCS, comprises two 50 kHz frequency segments. One 50 kHz segment is allocated for communication from a base station to a subscriber device. This frequency segment is commonly referred to as a "forward" or "down" link. Another 50 kHz segment is allocated for communication from the subscriber unit to the base station. This frequency segment is commonly referred to as a "reverse" or "up" link. This class of license is "symmetrical" in the sense that there is equal bandwidth on both the forward and reverse links. Typically, a base station is assigned a forward frequency channel and a corresponding reverse frequency channel for communication with a plurality of mobile units.

A second class of license, referred to hereinafter as "asymmetrical" NPCS, comprises a 50 kHz frequency segment on the forward link and a 12.5 kHz segment on the reverse link. This class of license is "asymmetrical" in the sense that there is less bandwidth available on the reverse link than on the forward link. Typically a base station is assigned a forward frequency channel for communication to a plurality of mobile units. All base stations are assigned the identical reverse frequency channels for receiving signals from the plurality of mobile units. Licensees can and will in some instances acquire contiguous licenses and thereby obtain larger blocks of frequency spectrum and greater bandwidth.

Paging systems typically communicated using only the forward link prior to the development of NPCS. There was very limited communication using the reverse link. The prior art paging systems used "simulcasting" or "broadcasting" techniques to send messages on the forward link. The transmissions of all of the base stations in a service area are identical and are synchronized in a simulcast system. Thus, transmissions from each transmitter station tend to reinforce each other. In many topographical scenarios transmissions received from several simulcast transmitters generally have improved signal strengths when compared to transmissions received from a single transmitter. Consequently, simulcast systems can transmit stronger signals into areas that suffer from large path losses. Disadvantageously, the net data transmission rate supported by simulcast systems is quite low. For example, the total bit rate supportable for an entire metropolitan area is typically only 2,400 bits per second (bps). To date, these low bit rates have been adequate for supporting numeric paging messages in which messages primarily comprise a simple telephone number. However, new services such as alphanumeric paging (where messages comprise a large number of text characters) require increased transmission bandwidth. Consequently, many paging systems are approaching capacity and cannot support such services.

Accordingly, it is desirable to provide a communication system which uses a small number of frequencies while substantially reducing significant co-channel interference. Additionally, it is desirable to enhance the efficiency and to increase the data bandwidth on the reverse link of the cellular communication system. The present invention provides such a cellular communication system.

SUMMARY OF THE INVENTION

The present invention is a time sharing method and apparatus for frequency reuse in cellular communication systems. Frequency reuse is enhanced by synchronizing cell transmit/receive base stations in a cellular system to a common time base, and then sharing the available frequencies via allocated time slots. That is, cells using the same frequency that may interfere with each other are activated only during selected time intervals while same-frequency cells nearby are deactivated. The deactivated cells are then in turn activated while previously activated same-frequency cells nearby are deactivated.

The frequency time slots may be of equal length, or longer time slots may be allocated to cells having higher usage rates, as determined in any of a number of ways. The time slots may be mutually exclusive, or may overlap.

The time sharing technique of the present invention allows design of cell systems with many reuse patterns or groups. Several particular cell reuse patterns are taught that provide good operational characteristics and low co-channel interference. A message-based control scheme provides for allocation of the time slots and handling certain problems with mobile subscriber unit handoff between cells.

The invention allows the use of a small number of cellular frequencies in a conventional cellular system without significant alteration of the existing system. However, the invention is particularly useful in two-way cellular paging systems.

One alternative embodiment of the present invention increases the efficiency and data bandwidth of the reverse link. Data bandwidth is increased by increasing the reuse of frequencies in the reverse link. Due to transmission characteristics of the reverse link, the reuse of frequencies can be denser than the reuse of frequencies in the forward link. Acceptable reverse link co-channel interference is achieved using dense reverse link frequency reuse groups.

The present invention uses the following three approaches for improving the reuse of frequencies in the reverse link of NPCS systems:

(1) In asymmetrical NPCS systems, improved reverse link data throughput is achieved by allowing the reverse channel of a cell or base station to be used to receive signals from a plurality of mobile units whenever a corresponding forward channel of the cell or base station is active. In accordance with this approach, all cells in a frequency reuse group having the same time-slot designation are activated to receive transmissions using a single reverse channel frequency. In three-to-one (three forward frequency channels per cell group for every one reverse frequency channel) asymmetrical systems (e.g., 50/12.5 kHz systems), this approach necessarily requires the frequency re-use on the reverse channel to be three times more dense than that of the forward channel.

(2) In asymmetrical NPCS systems, improved reverse link data throughput is achieved by allowing the mobile units to transmit using the reverse channel frequency during periods when the corresponding forward channels within a frequency reuse group are both active and inactive. Two channel access schemes are described for use with this approach. A "slotted ALOHA" channel access scheme may be used for transmission over the reverse link at all times. Alternatively, a hybrid approach may be used. For example, a DSMA-CD channel access scheme may be used when the corresponding forward channel is active while a slotted ALOHA scheme may be used when the forward channel is inactive.

(3) In symmetrical NPCS systems, improved reverse link data throughput is achieved by allowing use of the reverse channels during periods when the corresponding forward channels within a frequency reuse group are both active and inactive. Both the slotted ALOHA and DSMA-CD channel access schemes are used.

These three approaches are described in more detail hereinbelow. The details of the preferred and alternative embodiments of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations on the present invention.

The present invention is a time sharing method and apparatus for frequency reuse in a cellular communication system The invention allows the use of a small number of cellular frequencies in a conventional cellular system without significant alteration of the existing system. However, the invention is particularly useful in two-way cellular paging systems, although it may be used with any data communication system where co-channel interference is a problem.

Frequency reuse is enhanced by synchronizing cell transmit/receive base stations in a cellular system to a common time base, and then sharing the available frequencies via allocated time slots. The common time base for a cellular system may be generated by use of Global Positioning System (GPS) receivers, local time broadcasts, network timing, or other techniques.

Figure 1:
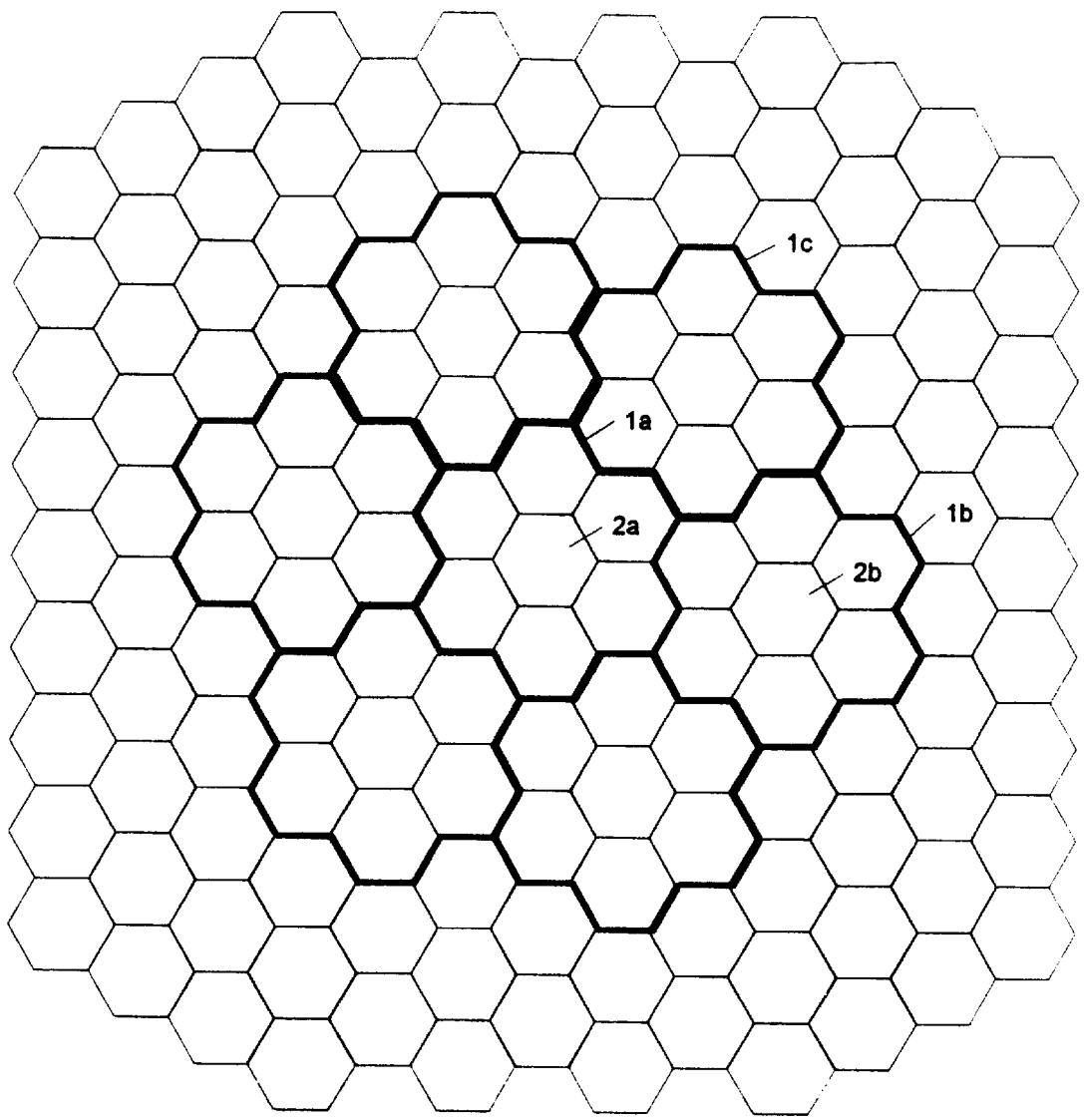
FIG. 1 is a block diagram of a prior art cell configuration showing the problem of frequency reuse.
Figure 2:
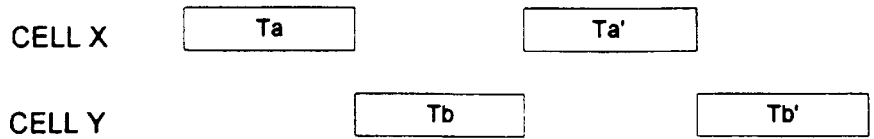
FIG. 2 is a timing diagram showing equal time slot allocations between two interfering cells in accordance with the present invention.

A number of different time slot allocation schemes may be used. For example, FIG. 2 is a timing diagram showing equal time slot allocations between two interfering cells in accordance with the present invention. The horizontal dimension represents time. In the example shown, a first co-channel interfering cell X (which may comprise one or more base stations) is activated during a first time period Ta, while a second co-channel interfering cell Y (which may comprise one or more base stations) is de-activated during the same first time period Ta. In a second time period Tb, the first cell X is de-activated while the second cell Y is activated. In a third time period Ta', the cells reverse state again, as in the first time period Ta, and so forth in the fourth time period Tb'. As described hereinafter with reference to FIG. 4, the time slot allocations can be unequal in duration. For example, time period Ta can be less than time period Tb.

Figure 3:
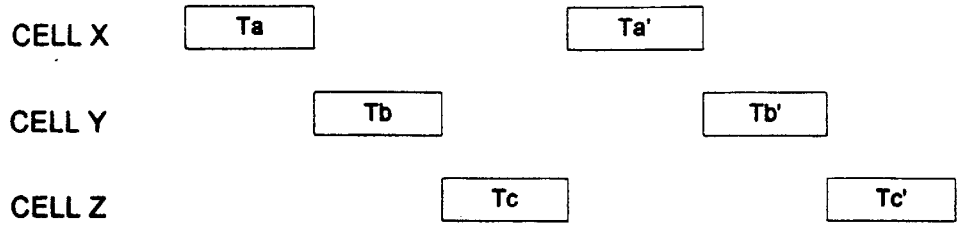
FIG. 3 is a timing diagram showing equal time slot allocations among three interfering cells in accordance with the present invention.

FIG. 3 is a timing diagram showing equal time slot allocations among three interfering cells X, Y, and Z during cyclical time periods Ta, Tb, and Tc. Although only a 3-time slot cycle is shown, 4 or 5 or more time slots could be used, with "extra" time slots being allocated to one or more of the cells based on relative usage among the cells. Alternatively, the durations of time periods Ta, Tb, and Tc can vary.

In general, the length of time slot periods should be substantially greater than the typical block transfer time for the system. Stated another way, time slots should be long enough so that the overhead associated with switching the channel on and off does not cause significant throughput loss, but short enough so that the system response time is still good. In the preferred embodiment, when the invention is used with a cellular paging system, the time for each period of activation may vary from about 5 to about 20 seconds. For example, in the Cellular Digital Packet Data (CDPD) protocol, a large number of data transfers may be made in a 10-second period. However, in other systems, the time periods may be shorter or longer.

Because each cell (or base station) "owns" a frequency for a relatively long period of time, the invention may be used by other protocols, such as by modifying circuit switched cellular systems and CDPD systems.

Figure 4:
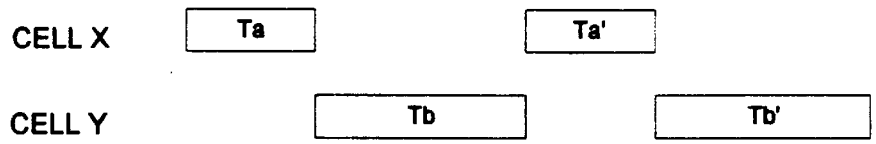
FIG. 4 is a timing diagram showing unequal time slot allocations between two interfering cells in accordance with the present invention.

FIG. 4 is a timing diagram showing unequal time slot allocations between two interfering cells X and Y in accordance with the present invention. Again, the cells X and Y may comprise one or more base stations. If the load or usage for cell Y is greater than the usage for cell X, cell Y can be assigned a longer activation time. The amount of usage of a cell may be determined in any of a number of ways, such as by
(1) counting and comparing the number of message blocks transmitted in each of cells X and Y, or (2) determining and comparing the average delay time in delivering messages for each cell, or (3) comparing the number of pending messages in each cell, or (4) comparing the number of mobile subscriber unit electronic registrations within such cells. Other means for determining cell usage may also be used.

Once usage is determined, the allocation of time between slots can be done in any desired fashion. For example, time can be allocated between high usage and low usage cells as a function of the ratio of their respective measured usage. As another example, such a ratio can be used, but with a minimum amount of time assigned to low usage cells. The assignment of slot times may be dynamic (e.g., based upon periodically measured usage) or static (i.e., pre-set based on historic usage).

Figure 5:
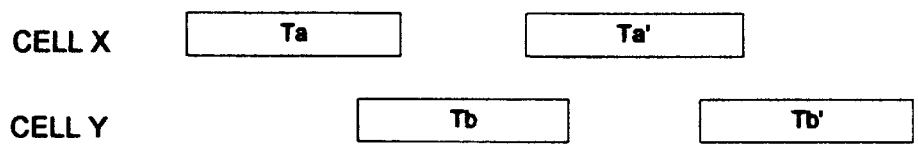
FIG. 5 is a timing diagram showing overlapped time slot allocations between two interfering cells in accordance with the present invention.

FIG. 5 is a timing diagram showing overlapped time slot allocations between two interfering cells in accordance with the present invention. As in FIG. 2, a first co-channel interfering cell X is activated during a first time period Ta, while a second co-channel interfering cell Y is de-activated during the majority of the same first time period Ta. As shown in FIG. 2, the second co-channel interfering cell Y is activated toward the end of the first time period Ta. In a second time period Tb, the first cell X is de-activated after a short period of time into the time period Tb, while the second cell Y is activated. In a third time period Ta', the cells reverse state again, as in the first time period Ta, and so forth in the forth time period Tb'. However, the time periods Ta and Tb overlap, so that subscriber units in each co-channel interfering cell have exclusive use of a channel during part of the time and must contend for the channel during part of the time (i.e., where the time periods overlap). Subscriber units in favored locations (e.g., with a good C/I ratio even when both cell base stations of a co-channel interference cell pair are on) may successfully use the channel at any time. Subscriber units in poor locations successfully use the channel when competing users are off (i.e., when the subscriber unit in the poor location has the exclusive use of the channel, since the C/I ratio is better when fewer interferers are on). In contrast, when competing users are active, their transmissions will fail. Such a channel overlap scheme allows for greater channel utilization with a small increase in system complexity.

Figure 6:
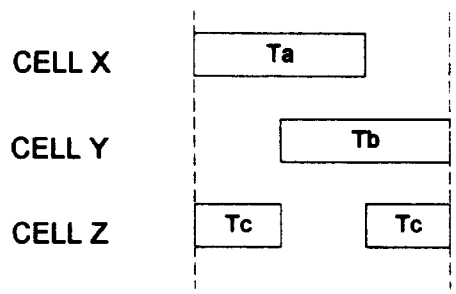
FIG. 6 is a timing diagram showing overlapped time slot allocations among three interfering cells in accordance with the present invention.

FIG. 6 is a timing diagram showing overlapped time slot allocations among three interfering cells in accordance with the present invention. Again, the cells may comprise one or more base stations. As shown, three time periods Ta, Tb, and Tc, overlap is such a way that only two frequencies are active during a cycle. This configuration improves the C/I ratio compared to systems that do not time share frequencies, but does not provide as great an improvement as configurations where time slots do not overlap. However, this configuration allows mobile units more frequent access to the channel. Such a configuration may be useful in systems that have better tolerance to interference, or where terrain conditions result in more homogenous path loss conditions so that extremes of C/I are encountered less frequently.

The time sharing technique of the present invention allows cell systems to be designed using many different reuse patterns. Careful allocation of reused frequencies and time slot durations results in particular cell reuse patterns that provide good operational characteristics and low co-channel interference. In general, it is desirable (but not necessary) to have frequency reuse groups or cell groups be approximately circular. In addition, optimal reuse patterns can generally be determined by applying two rules of thumb: first, equally spacing co-channel interferers as far apart as possible among all cells (not just those in one cell group) to minimize co-channel interference, and second, placing adjacent channel interferers (i.e., those cells using adjacent frequencies at the same time) in non-adjacent cells (this may not be possible for small cell groups) to e adjacent channel interference.

Figure 7:
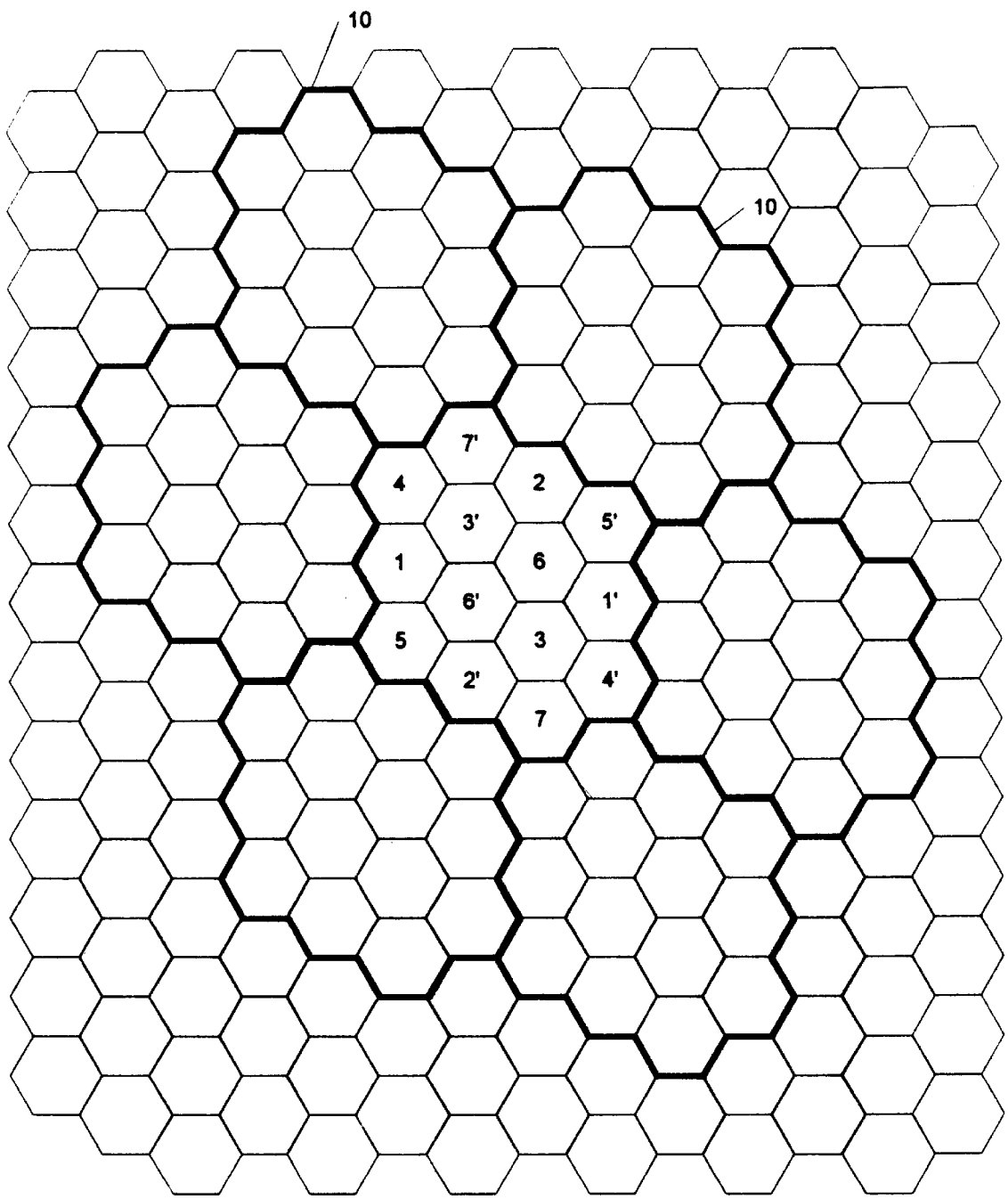
FIG. 7 is a block diagram of a cell configuration showing the geographic allocation of seven frequencies and two time slots for 14-cell clusters of a cellular system in accordance with the present invention.

FIG. 7 is a block diagram of a cell configuration showing the geographic allocation of seven frequencies and two time slots for 14-cell clusters or cell groups of a cellular system in accordance with the present invention. Seven 14-cell groups 10 are shown. In each cell group 10, seven frequencies are time-shared between the 14 cells during two alternating time slots, such that the "plain" numbered cells 1 through 7 are on during a first time period Ta and the "prime" numbered cells 1' through 7' are on during a second time period Tb. This particular cell group shape, and the pattern of allocations within each cell group 10, places all co-channel interferers in adjacent cell groups at equal distance and places all co-channel interferers as far away from each other as possible. This arrangement has been shown to provide a substantial improvement in the percentage of cell area that has an acceptable C/I ratio compared to a system with seven frequencies and no time sharing. This arrangement also has no neighbor cells that use adjacent frequencies at the same time. However, other allocations of the cells within each cell group 10 may be used with comparable results.

Figure 8:
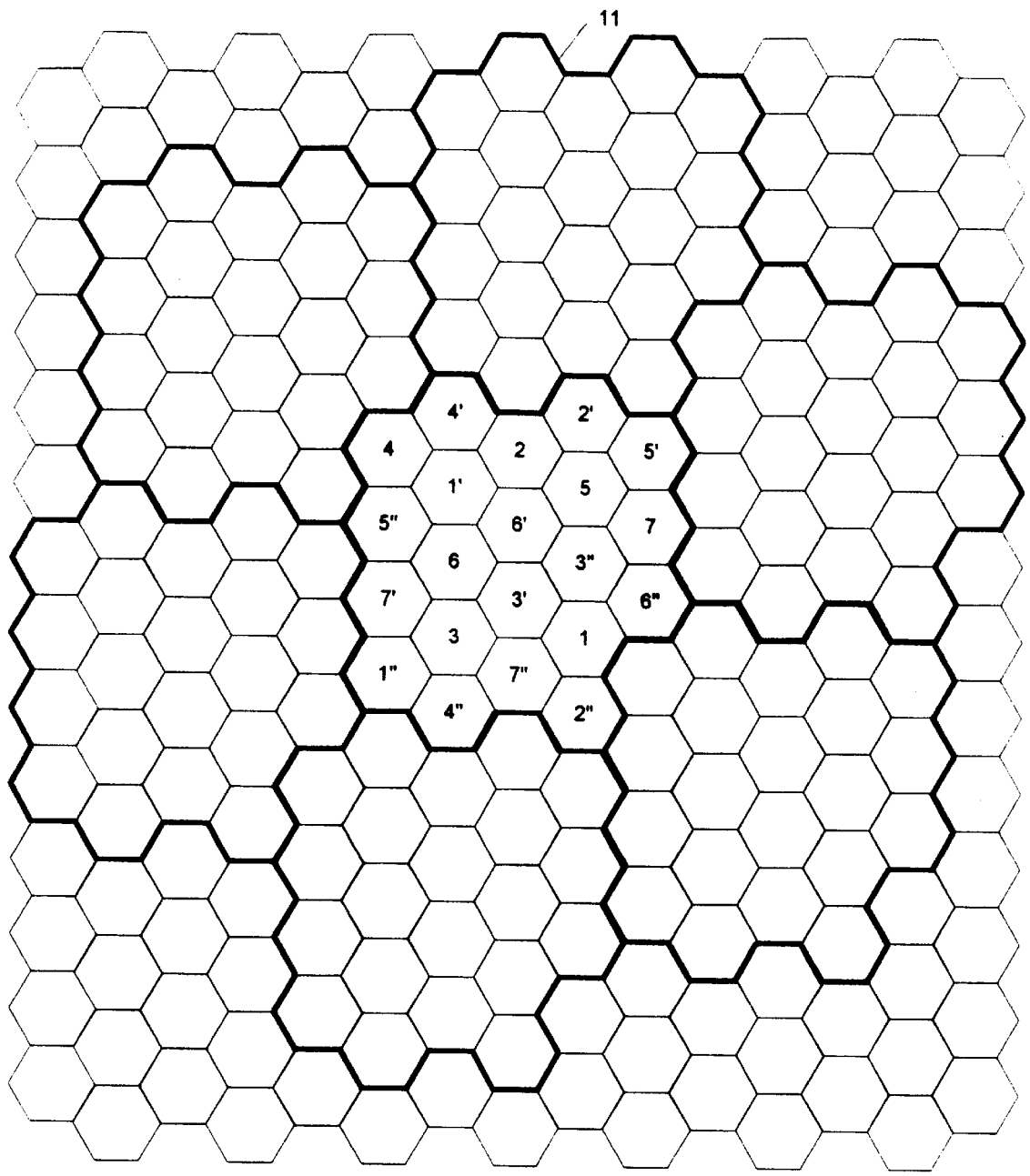
FIG. 8 is a block diagram of a cell configuration showing the geographic allocation of seven frequencies and three time slots for 21-cell clusters of a cellular system in accordance with the present invention.

FIG. 8 is a block diagram of a cell configuration showing the geographic allocation of seven frequencies and three time slots for 21-cell groups of a cellular system in accordance with the present invention. Seven 21-cell groups 11 are shown. In each cell group 11, seven frequencies are time-shared between three sets of seven cells 11 (totaling 21 cells), such that the "plain" numbered cells 1 through 7 are on during a first time period Ta, the "single prime" numbered cells 1' through 7' are on during a second time period Tb, and the "double prime" numbered cells 1" through 7" are on during a third time period Tc. This particular cell group shape, and the pattern of allocations within each cell group 11, places all co-channel interferers in adjacent cell groups at equal distance and places all co-channel interferers as far away from each other as possible. This arrangement has been shown to provide a substantial improvement in the percentage of cell area that has an acceptable C/I ratio compared to a system with seven frequencies and no time sharing or to a system with seven frequencies and two time slots (as shown in FIG. 7). This arrangement also has no neighbor cells that use adjacent frequencies at the same time. However, other allocations of the cells within each cell group 11 may be used with comparable results.

Figure 9:
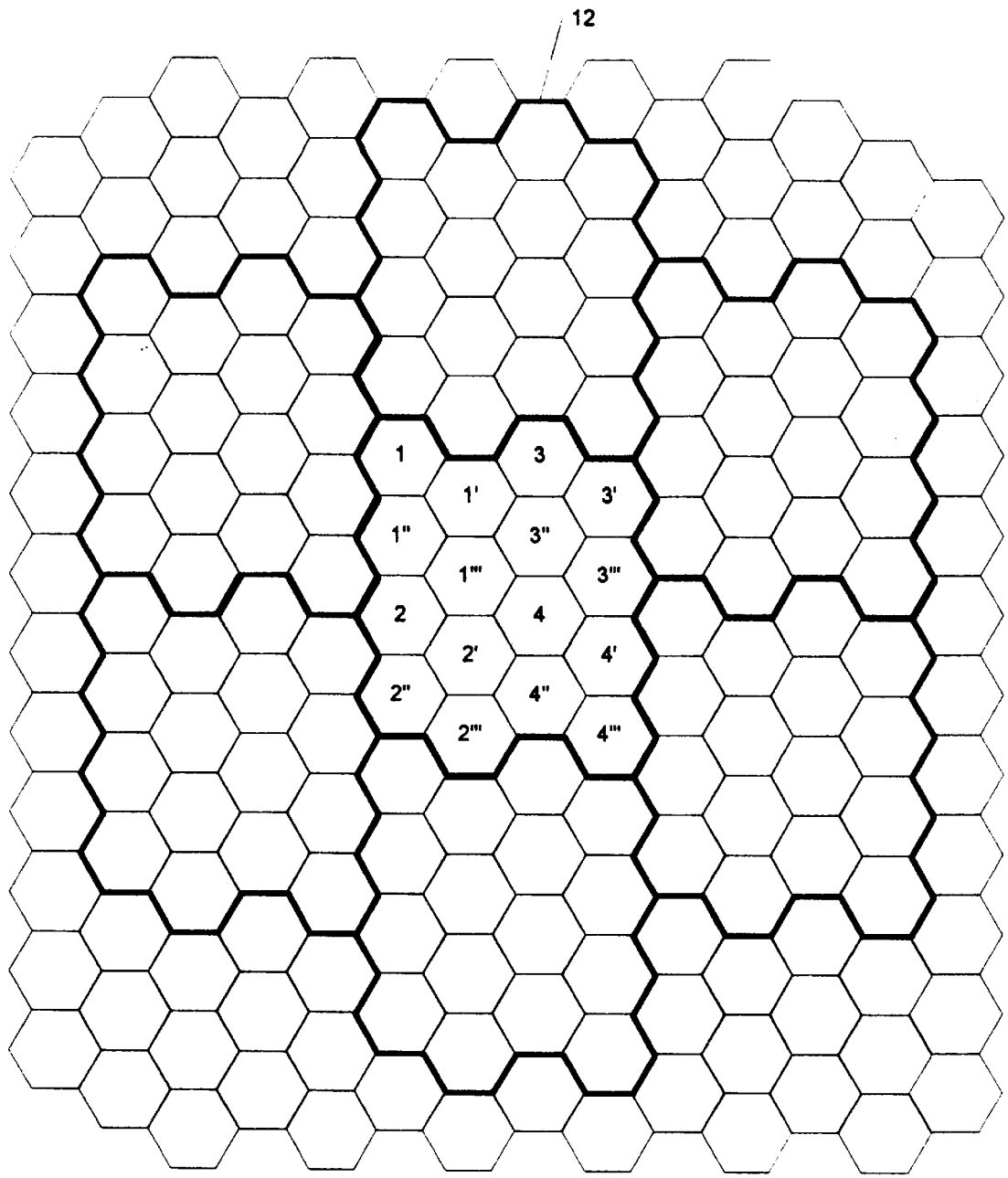
FIG. 9 is a block diagram of a cell configuration showing the geographic allocation of four frequencies and four time slots for 16-cell clusters of a cellular system in accordance with the present invention.

FIG. 9 is a block diagram of a cell configuration showing the geographic allocation of four frequencies and four time slots for 16-cell groups of a cellular system in accordance with the present invention. Seven 16-cell groups 12 are shown. In each cell group 12, four frequencies are time-shared between four sets of four cells (totaling 16 cells), such that the "plain" numbered cells 1 through 4 are on during a first time period Ta, the "single prime" numbered cells 1' through 4' are on during a second time period Tb, the "double prime" numbered cells 1" through 4" are on during a third time period Tc, and the "triple prime" numbered cells 1'" through 4'" are on during a fourth time period Tc. This pattern is of note because only four frequencies are required to service the cellular system instead of seven. This particular cell group shape, and the pattern of allocations within each cell group 12, places all co-channel interferers at equal distance and as far away from each other as possible, and can be shown to provide the best possible C/I performance for the number of cells in the group 12. This arrangement also has no neighbor cells that use adjacent frequencies at the same time.

Figure 10:
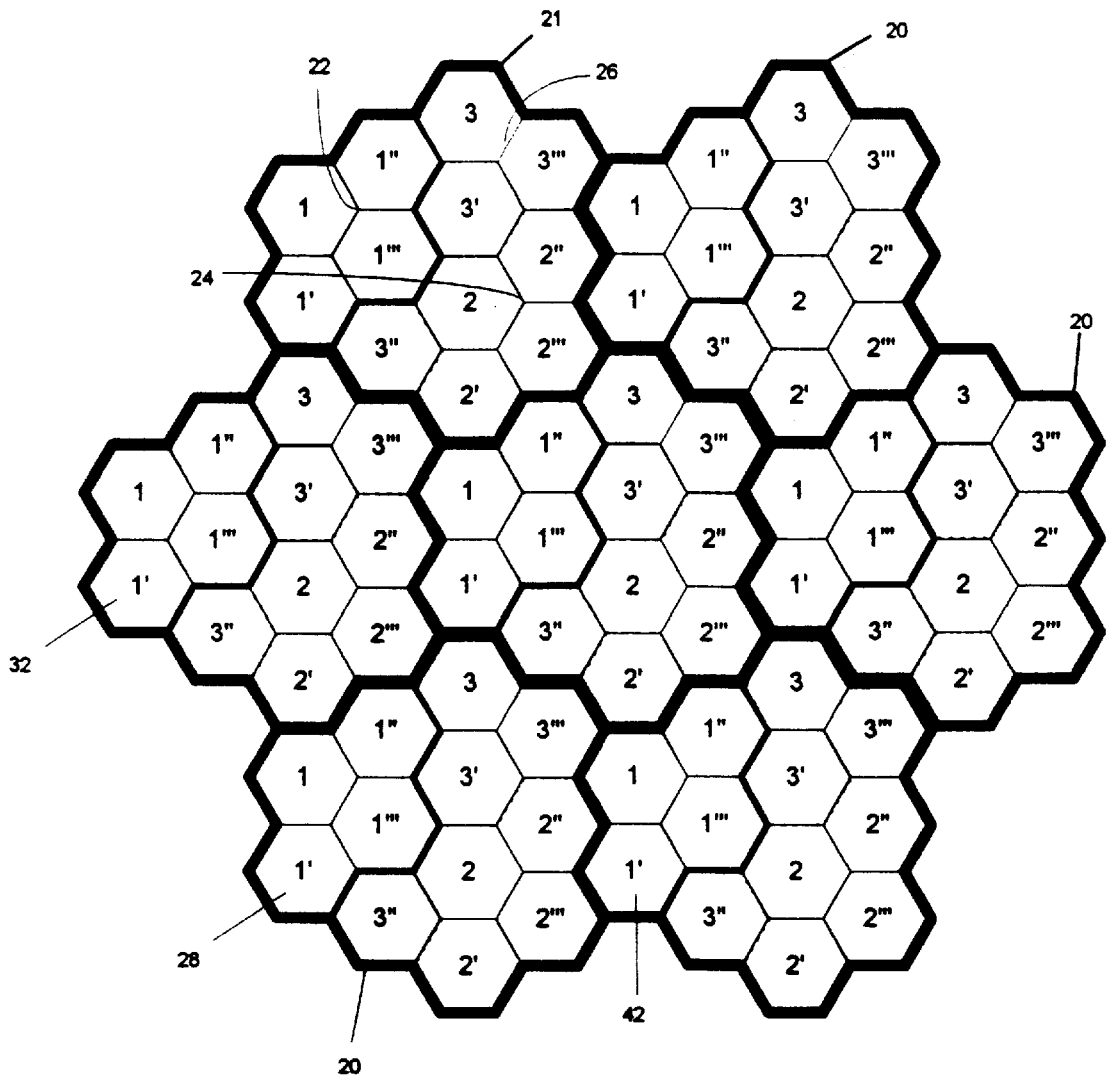
FIG. 10 is a block diagram of a cell configuration showing the geographic allocation of three frequencies and four time slots for 12-cell clusters of a cellular system in accordance with the present invention.

Dense Reverse Link Frequency Re-use Patterns for use in Asymmetrical NPCS License Scenarios—Allowing Subscriber Units to Transmit whenever the Forward Link is Active Another desirable configuration for small bandwidth systems (e.g., 50 kHz band licenses used in NPCS systems) allocates three frequencies and 3, 4, or 5 time slots for 9-cell, 12-cell, and 15-cell groups, respectively, of a cellular system, using the principles described above. FIG. 10 shows an exemplary frequency reuse pattern having 3 forward link frequency channels and 4 time slots. As shown in FIG. 10, 12 cells comprise a cell group or frequency reuse group 20. Seven 12-cell cell groups 20 are shown. The cell groups 20 operate in similar fashion to those described above with reference to FIG. 9. Each cell group 20 comprises a plurality of time-slotted cell subsets (e.g., subsets 22, 24, and 26). Each cell in a cell subset is assigned an identical forward frequency channel. The forward frequency channel is unique within the cell group corresponding to the subset. Assuming that there is one base station per cell, each base station of a selected cell subset is assigned an identical forward frequency channel, and this channel is unique to the subset within the selected cell group.

For example, as shown in FIG. 10, cell group 21 comprises 3 cell subsets, 22, 24, and 26. Each of the four cells of the subset 22 is assigned a first forward frequency, indicated in FIG. 10 by the number 1 (the "primed" indicators show the time periods that the cell is activated as is described in more detail hereinbelow). This first forward frequency is unique within the cell group 21 (i.e., no other cell subset in the cell group 21 contains cells assigned this same first frequency). Similarly, all four cells of subset 24 are assigned a second forward frequency, indicated by numbered cells 2, which is unique within the cell group 21. Finally, all four cells of subset 26 are assigned a third forward frequency, indicated by numbered cells 3, which is unique within the cell group 21.

In accordance with the present invention, each cell within a corresponding subset is periodically enabled to transmit on its assigned forward frequency only during a time period in which no other cell in the subset is so enabled. For example, as shown in FIG. 10, in each cell group 20, three forward frequencies are time-shared between three subsets of four cells (totaling 12 cells), such that the "plain" numbered cells 1 through 3 are on during a first time period Ta, the "single prime" numbered cells 1' through 3' are on during a second time period Tb, the "double prime" numbered cells 1" through 3" are on during a third time period Tc, and the "triple prime" numbered cells 1'" through 3'" are on during a fourth time period Td.

Cells in neighboring cell groups having identical forward frequency designations can potentially interfere with each other. For example, because their transmitters are on at the same time and on the same frequency, the forward link of cell 28 having the designation 1' can potentially interfere with the forward links of cells 32, 42 having the same designation. However, no two cells within a cell group 20 can interfere with each other on the forward link because no two cells having identical forward frequencies are concurrently enabled to transmit on the forward link.

In a preferred embodiment of the present invention all cells having identical time slot designations can enable concurrent transmissions to be received by their base stations over a single reverse frequency channel. For example, referring again to FIG. 10, all of the "plain" numbered cells 1 through 3 can enable their base stations to receive signals over the reverse link during the first time period Ta, all of the "single prime" numbered cells 1' through 3' can enable their base stations to receive signals using the reverse link during the second time period Tb, the "double prime" numbered cells 1" through 3" can enable their base stations to receive signals using the reverse link during the third time period Tc, and the "triple prime" numbered cells 1'" through 3'" can permit the reception of signals using the reverse link during the fourth time period Td.

All cells with the same time-slot designation (i.e., "plain", single prime, double prime, and triple prime) can potentially interfere with each other when their mobile units are allowed to transmit on the reverse link. It should be noted that potentially interfering cells can be much closer together on the reverse link than on the forward link and can thus be significantly stronger. The close proximity of potentially interfering cells is balanced by the fact that on the forward link all cells with the same designation are simultaneously turned on at full power so the interference effect never varies, whereas on the reverse link subscriber devices or mobile units turn on and off depending on their data transmission needs. As a result, two cells with the same time-slot designation do not necessarily both have active subscribers or mobile units at a given time. In addition, the subscriber devices intended for use with the present invention may employ power controls to limit their transmission power to no more than that required for acceptable reception by their corresponding base station. Consequently, even when subscriber units transmit simultaneously the resulting interference on the reverse link may be less than that on the forward link which does not use power control.

It is possible to simulate co-channel interference on the reverse link for communication systems having different reuse configurations. As described above, a key determinant of system performance is the ratio of the carrier power of a desired signal to the power of an interferer received at a base station (C/I). Simulations provide data that is used to determine the probability that the C/I for a given system configuration falls within a desired range. The probability data is used to determine the average block error rate (BLER) as a function of C/I. The BLER data is used as a parameter to model the effects that different frequency reuse configurations and channel access schemes have on data throughput on the reverse link.

Figure 11:
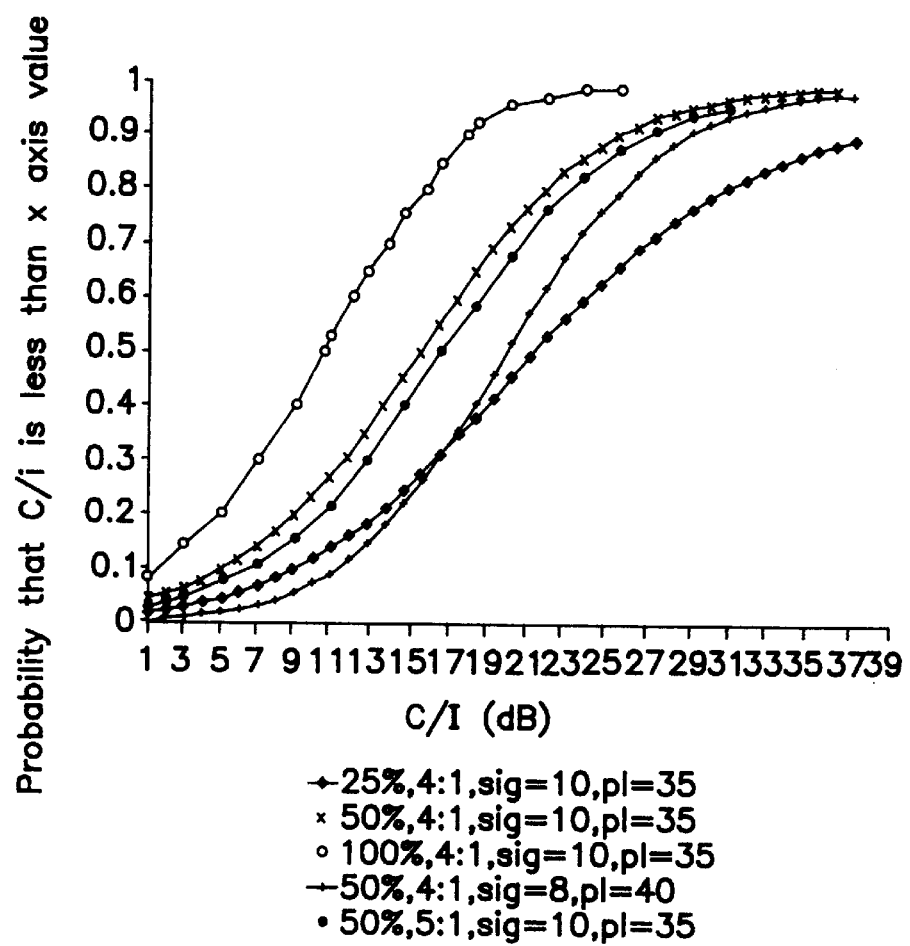
FIG. 11 shows plotted curves representing C/I probabilities given varying channel loadings under differing channel conditions.

FIG. 11 shows the simulated effects of co-channel interference. The plotted curves represent C/I probabilities given varying channel loadings under differing channel conditions (such as path loss (pl) and shadowing variance (sig)). The various channel loading conditions are provided in the legend. Points along the y axis indicate the probability that the C/I of a given communication system is less than some selected level (in dB) as indicated along the x axis. For example, as shown in FIG. 11, the probability that the C/I of a system is less than 17 dB when the loading is 25% is about 0.3. This data is correlated with data that provides the BLER as a function of C/I to determine the average BLER for any given communications system.

The average BLER data is used as a parameter when simulating the performance of systems using differing channel access schemes. Channel access schemes are used to arbitrate access by two or more subscriber units to the same reverse frequency channel. The rate at which subscriber devices attempt access to a channel (referred to hereinafter as the "offered load") is varied and the results observed. The detrimental effect of packets lost due to collision (i.e., simultaneous transmissions by two or more subscriber units in the same cell) and packets lost due to co-channel interference are simulated.

A first well-known prior art channel access scheme is commonly referred to as Digital Sense Multiple Access with Collision Detect (DSMA-CD). In accordance with DSMA-CD, whenever a base station detects the presence of a subscriber unit transmission on the reverse channel it asserts a periodically occurring flag, called a "busy/idle" flag, on the forward channel. This flag is asserted logically true whenever the channel is busy. Any subscriber unit that is transmitting when the busy/idle flag is set true may continue to transmit. However, other subscriber units desiring access to the channel must wait until the busy/idle flag is reset or cleared indicating that the channel is idle and available. A second flag on the forward channel (referred to as the "decode status" flag) indicates whether the block received by the base station was determined to be error-free after error correcting decoding is completed.

Occasionally, two or more subscriber units may concurrently initiate the transmission of data. In this case a "collision" occurs. When power controls are used, the signals transmitted by the subscriber units are usually received by the base station at comparable signal levels. In these cases the base station will be unable to successfully decode any of the signals due to co-channel interference. The base station therefore sets the decode status flag indicating a decode failure. When a subscriber unit receives a failure flag it assumes that a collision occurred and ceases transmitting. Each subscriber unit waits a random time period to access the channel again, first sampling the busy/idle flag to determine whether the channel is available.

Less commonly, one of the signals received by the base station is much stronger than any other signal. In these cases the weaker signals may not sufficiently interfere with the stronger signal to prevent a successful decoding of the stronger signal. If this occurs the base station indicates a successful decode status. Each subscriber unit consequently assumes that its transmission was successfully received and decoded by the base station. However, higher levels of communication network protocol will fail to provide an acknowledgment to the subscriber units transmitting weaker signals. The description and operation of the higher levels of communication protocol is beyond the scope of the present invention. The subscriber units transmitting weaker signals eventually determine that their previous transmissions failed. Each such subscriber unit subsequently attempts to retransmit its failed message.

An alternative to the DSMA-CD channel access scheme is the slotted ALOHA scheme. The well known ALOHA scheme was first devised by Abramson and others at the University of Hawaii in 1973. The first ALOHA system employed a satellite repeater that broadcast packets received from various users accessing the satellite. In accordance with the ALOHA system, all users monitor satellite transmissions and thereby determine whether their packets are successfully transmitted. Two types of ALOHA systems are known: synchronized or slotted and unsynchronized or unslotted. For a more detailed description of the ALOHA system, see *Digital Communications*, John Proakis, 3rd Edition, pp. 862–868 (1995). In slotted ALOHA systems, users transmit data in time slots that have specified beginning and ending times.

One preferred alternative embodiment of the present invention contemplates using the slotted ALOHA channel access scheme to arbitrate access to channels on the reverse link, with the slot timing synchronized among all of the base stations. When co-channel interference is high, slotted ALOHA schemes force all signals to be aligned in time. This, in turn, forces interference conditions to be held constant over the duration of a data block. In contrast, when using a DSMA-CD channel access scheme, an interferer can partially overlap a desired block. Because partial block overlaps can cause block errors almost as readily as complete block overlaps, the interference-induced block error rate for DSMA-CD tends to be substantially higher than that for slotted ALOHA with synchronized base stations.

Figure 12:
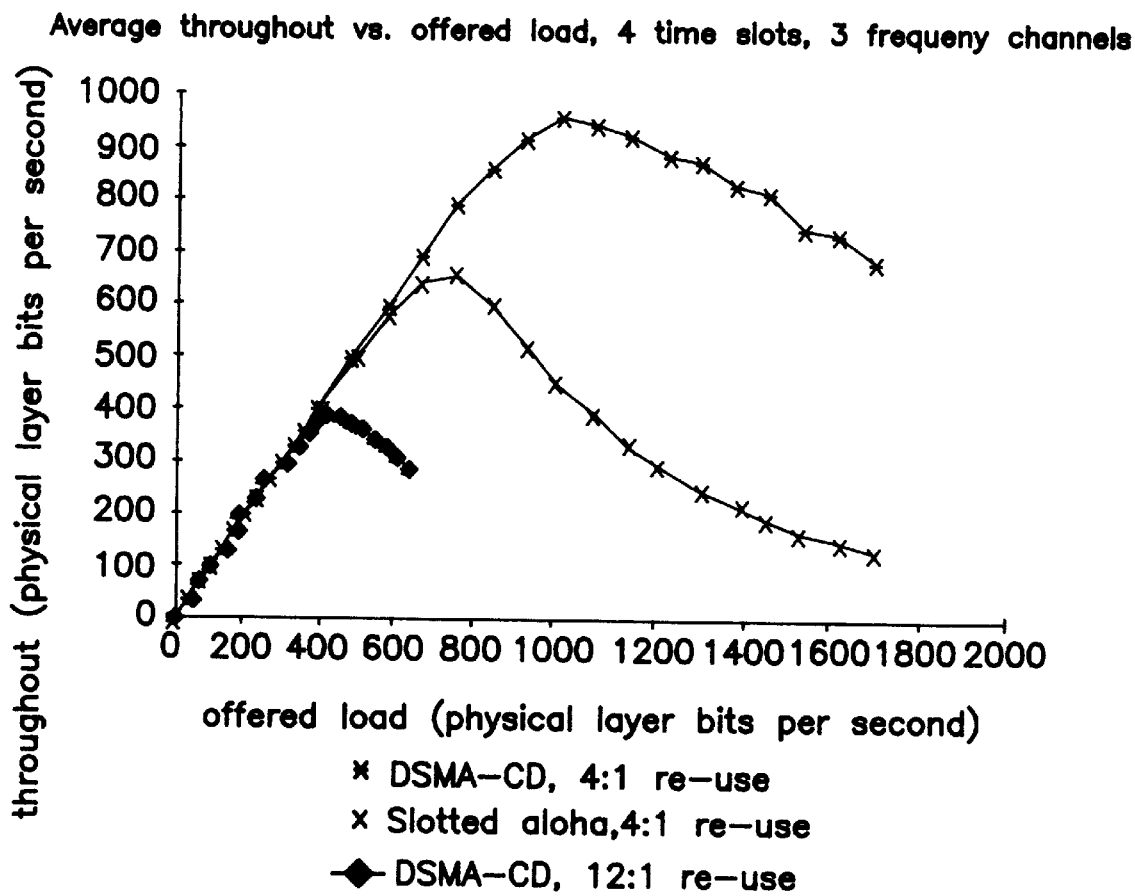
FIG. 12 shows the average data throughput for cellular communication systems using a forward link frequency re-use pattern that provides low co-channel interference.

FIG. 12 shows the average data throughput for cellular communication systems using a forward link frequency re-use pattern that provides low co-channel interference and good operational characteristics. The simulated system uses a forward link frequency re-use pattern having three frequency channels multiplexed over 4 time slots (as shown in FIG. 10). The simulated system is similar to those conforming to the personal Air Communication Technology (PACT) system specification, release 1.1, (hereinafter referred to as the pACT specification) distributed by the American Telephone and Telegraph (AT&T) Wireless Services company. As described in Part 401 of the pACT specification, data transmissions use a GMSK modulation at a data rate of 8.0 kbps.

The average data throughput for the simulated system uses three different reverse link frequency re-use techniques: (1) a DSMA-CD channel access scheme is used on the reverse link, and the reverse link frequency re-use plan is identical to the forward link frequency re-use plan; (2) a DSMA-CD channel access scheme is used on the reverse link, and the reverse link frequency re-use plan corresponds to the time re-use of the forward link (i.e. the reverse link frequency re-use plan is three times denser than the forward link frequency re-use plan); and (3) the same as (2) except that the system uses a slotted ALOHA channel access scheme instead of a DSMA-CD scheme on the reverse link. The throughput results account for the effects of the expected block error rates associated with a selected reverse link frequency re-use scheme. The term "offered load" is used here as a ratio. For example, the probability that an individual subscriber unit attempts to access a channel in a given micro-slot is x*(re-use/8,000)/(n*m), where n is the number of subscribers in the simulation and m is the number of micro-slots in a message block. The term "reuse" in this equation is the time reuse factor. For example, in a system using 12:1 time slotting the "reuse" is 12. In a system using 4:1 reuse, the reuse is 4. Retransmission attempts are not included in the offered load.

Both the slotted ALOHA and DSMA-CD schemes use retransmission algorithms which allow subscriber units to determine whether their transmissions collided with other transmissions or were successfully received by a corresponding base station. There are many retransmission solutions known in the art. In accordance with the DSMA-CD channel access scheme, flags in the forward link block follow the transmission on the reverse link to indicate whether a block was successfully received. Slotted ALOHA schemes can use similar flags, or alternatively, can periodically provide a list of subscriber identifiers to indicate which subscriber unit transmissions were received since the last receive status list was transmitted.

A review of the simulation results shown in FIG. 12 reveals that the average data throughput is approximately 380 bps using the identical frequency re-use pattern on the reverse link as used on the forward link. However, by allowing the reverse channel re-use to be three times denser than the forward channel re-use in asymmetrical frequency license scenarios (e.g., in NPCS 50/12.5 kHz licenses), the average bit rate is increased to approximately 650 bps using a slotted ALOHA channel access scheme, and increased to approximately 950 bps using a DSMA-CD channel access scheme. Reverse channel throughput is thus improved by a factor of about 1.7 to 2.5 depending upon the channel access scheme and reuse plan utilized.

To obtain the DSMA-CD performance shown with dense reverse link frequency re-use requires that the standard packet structure be modified slightly so that each message begins with a preamble sequence unique to the reverse channel re-use group. In the preferred alternative embodiment of the present invention a "1010" dotting sequence is used for all messages. When the sequence is identical for all cells interferers can cause the base station to declare that the channel is busy. This interference phenomenon wastes channel resources. However, this effect can be reduced to insignificant levels by using orthogonal preamble sequences. "Gold codes" are exemplary orthogonal preamble sequences. Gold codes are described in the prior art, for example, a description of gold codes may be found in "*Digital Communications by Satellite*", James Spilker, published by Prentice Hall in 1977.

While DSMA-CD schemes are more efficient, slotted ALOHA schemes may be preferred when there is a desire to reduce subscriber unit costs. Slotted ALOHA schemes allow use of subscriber units having relatively slow switching synthesizers, which, in turn, reduces the costs of the subscriber units. Half-duplex subscriber units are less expensive than full-duplex units because the radio can be designed without need for an expensive duplexer. Also, the transmitter and receiver of a half-duplex subscriber unit share a synthesizer and do not need a second local oscillator (typically used to compensate for the difference between forward and reverse link carrier frequencies). The synthesizer in a half duplex subscriber device using DSMA-CD must switch between receive and transmit frequencies in the time spanned by just a few bits (less than 1 millisecond) because the protocol requires the subscriber device receiver to sense the state of the busy/idle flag immediately prior to transmitting a packet. In contrast, there is no such requirement for subscriber units which use a slotted ALOHA scheme because these units can wait for a much longer period of time before switching between receive and transmit frequencies. This aspect of the slotted ALOHA scheme relaxes the synthesizer requirements and facilitates the manufacture of less expensive subscriber units. Thus, slotted ALOHA schemes may be preferred in some cases despite the incurred capacity gain penalties.

Dense Reverse Link Frequency Re-use Patterns for use in Asymmetrical NPCS License Scenarios—Allowing Subscriber Units to Transmit when the Forward Link is Inactive Another alternative embodiment of the present invention increases data throughput by allowing subscriber units to transmit when the corresponding forward channel is inactive. Dense reverse link frequency re-use is thereby obtained. Taken to an extreme this approach allows subscriber devices to transmit on the reverse link at any time, i.e., whether or not the forward channel is active. Because there are no DSMA control flags present when the forward link is inactive, a slotted ALOHA channel access scheme must be used. A slotted ALOHA channel access scheme can be used at all times. Alternatively, a system can use a hybrid approach wherein DSMA-CD is used when the forward channel is active and slotted ALOHA is used when the forward channel is inactive.

A system that uses a slotted ALOHA channel access scheme and that permits reverse link transmissions at any time, regardless of whether the forward link is active or inactive, can achieve a 12% throughput with one-to-one reuse patterns. As long as the offered load is restricted to 15% in such a system, the error rates caused by co-channel interference will remain sufficiently low so that a 12% throughput can be achieved. If the offered load increases beyond this level the resultant error rate increase drives the throughput down below 12%. Because the reverse link is available 100% of the time in this alternative embodiment, the net average bit rate is 12% of the data transmission rate of the system. As described hereinabove, the pACT system uses a GMSK modulation at a data rate of 8.0 kbps. Therefore, for pACT systems, the net average bit rate is 12% of 8,000, or 960 bps. This performance gain is nearly the same as that obtained by the system described above with reference to FIG. 12 which uses a DSMA-CD channel access scheme with a 4:1 frequency re-use plan.

The throughput obtained using this alternative design can be substantially improved with a few minor modifications to the design. First, when the forward channel is active, the system preferably uses a DSMA-CD channel access scheme for transmission of data on the reverse link. This technique produces a throughput of approximately 950 bps (assuming a four-to-one reuse pattern) as described above with reference to FIG. 12. This technique, however, increases the loading for active cells considerably above 15%. To compensate for this effect the loading for inactive cells (cells with inactive forward links) must be substantially reduced to maintain the co-channel interference at tolerable levels. One approach to reducing the loading for the inactive cells is to assign certain portions of the inactive forward link times to a subset of the reverse link transmissions. This approach is shown diagrammatically in FIGS. 13a–13c.

Figure 13A:
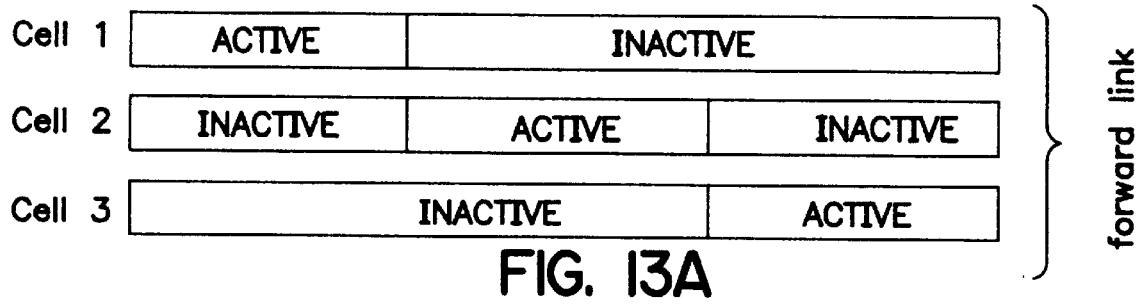
FIGS. 13a–13c diagrammatically illustrate alternative approaches to reducing the loading of cells by assigning certain portions of inactive forward link durations to a subset of reverse link transmissions.
Figure 13B:
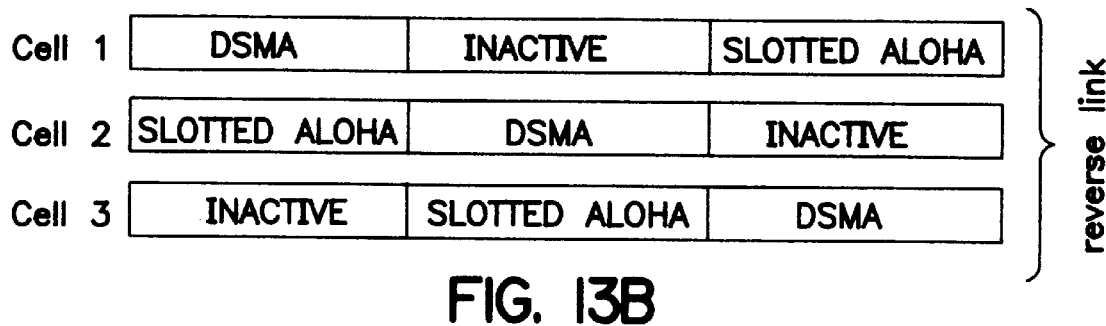
Figure 13C:
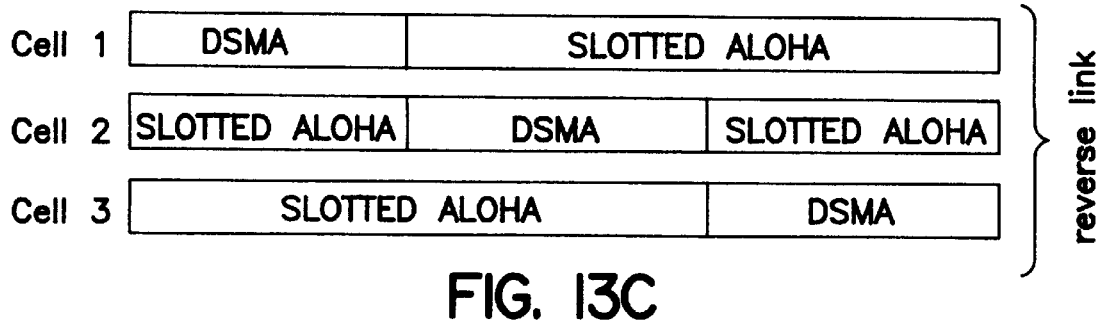

The forward link activity is shown in FIG. 13a. For example, "cell 1" is active for about ⅓ of the duration shown. Otherwise, cell 1 is inactive. Cell 2 is inactive for the first period shown in FIG. 13a, active for the second period, and inactive again for the last period shown in FIG. 13a. Cell 3 is inactive for approximately ⅔ of the duration shown, and active for ⅓ of the duration shown. FIGS. 13b and 13c show the activity of the reverse link for two possible alternative designs of the present invention. FIG. 13b shows reverse link cell transmissions from subscriber units restricted to portions of the inactive forward link transmission periods shown in FIG. 13a. By restricting reverse link transmissions from subscriber units to occur only during a portion of the periods when the forward link transmissions are active (as shown in FIG. 13a) the number of potential interferers can be reduced while still maintaining a very low loading and an acceptable error rate. As shown in FIGS. 13a and 13b, when the forward channel is active, the system preferably uses a DSMA-CD channel access scheme for transmission of data from the subscriber units using the reverse link. In addition, as shown in FIG. 13b, the system preferably uses a slotted ALOHA scheme for transmission of data from the subscriber units on the reverse link during portions of the total inactive forward link transmission time. The average throughput of a system designed in this manner can approach between 1100 to 1200 bps.

FIG. 13c shows a more aggressive approach as compared with the approach depicted in FIG. 13b. As shown in FIG. 13c, a DSMA-CD scheme is used to transmit data during periods when the forward links are active. However, a slotted ALOHA scheme is used to transmit data on the reverse link whenever the forward link is inactive. In asymmetrical frequency license systems (e.g., in NPCS 50/12.5 kHz licenses) there is often only one available reverse channel. Consequently, a low loading must be maintained during the reverse link slotted ALOHA transmission times in order to produce an acceptable error rate. By restricting the reverse link slotted ALOHA transmissions to occur only during portions of the total forward link active periods as shown in FIG. 13b, the loading is forced to be at acceptable levels.

Dense Reverse Link Frequency Re-use Patterns for use in Symmetrical NPCS License Scenarios—Allowing Subscriber Units to Transmit when the Forward Link is Inactive The design just described for use in asymmetrical NPCS license environments also has applicability in symmetrical NPCS license environments. The forward link and reverse link frequency re-use are not identical when the subscriber units are allowed to transmit at any time because there is denser frequency re-use on the reverse channel. A typical symmetrical system requires the use of four time slots. If the subscriber units access a channel using DSMA-CD when the forward channel is active, and access a channel using slotted ALOHA when the forward channel is inactive, throughput of 60% are attainable during active portions, and throughput of 25% are attainable during inactive portions. The theoretical 36% limit of slotted ALOHA is not attainable due to the error rates caused by co-channel interference. The throughput therefore for pACT systems is 8,000*(0.6+3*0.25)/4, or approximately 2,700 bps. The reverse channel throughput is only approximately 1,200 bps in systems where subscriber units are not allowed to transmit when the forward link is inactive. Therefore, this alternative embodiment increases the throughput capacity on the reverse channel by a factor of 2.25.

Using systems designed in accordance with the present invention, there is potential for substantial throughput improvement for carriers holding two contiguous symmetrical licenses. When seven frequency channels are available to a carrier, typically only two time slots are used. Occasionally, three time slots are needed. The reverse channel re-use of a system having seven frequency channels is fairly sparse. Consequently, the ideal slotted ALOHA throughput of 36% can be approached. The average reverse link throughput is approximately 2400 bps in existing systems using two time slots. The average reverse link throughput is approximately 1600 bps in existing systems using three time slots. However, systems designed in accordance with the present invention produce increased throughput of 8,000*(0.6+0.35)/2 or 3,800 bps using two time slots, and 8,000*(0.6+2*0.35)/3 or 3,467 bps using three time slots. Thus, the present alternative improves performance by a factor of 1.6 ( for two time slots) and 2.2 (for three time slots) as compared to the prior art.

The present invention can be implemented with existing NPCS cellular communication equipment. For example, base stations capable of receiving messages on the reverse link during periods when the forward link is inactive may be modified to transmit decode status messages near the beginning of active transmissions. The decode status messages are used to identify all subscriber devices from which the base station successfully received messages during the last inactive period. Subscriber devices compliant with existing standards will ignore the decode status messages because they contain message type identifiers that are undefined for these subscriber devices. However, subscriber devices designed in accordance with the present invention will recognize the decode status messages and act accordingly. Upon receipt of a decode status message the modified subscriber device will enable transmissions on the reverse link during inactive periods on the forward link. Similarly, if the subscriber device does not receive a decode status message it will not transmit on the reverse link when the base station is inactive.

The following example demonstrates how an existing time sharing system using DSMA only can be modified to allow subscriber units to transmit on the reverse frequency channel during periods when the forward frequency channel is inactive using a slotted ALOHA scheme in accordance with the novel technique of the present invention.

The base station in existing systems periodically transmits messages providing information about the current channel and about channels used in neighboring cells. This information is typically used by the subscriber unit to determine which base station to select as the server that will provide the best performance. The information contained in these messages includes fields that describe the vendor of the base station equipment and the version of software running in the base station. By making use of these fields, a base station can indicate to subscriber devices or mobile units that it has the capability to support a slotted ALOHA scheme. Mobiles that have slotted ALOHA capability can thus determine when a base station is compatible with the present invention. Thus, a system having a mix of mobile units and base stations (some that are compatible and some that are incompatible with the present invention) can function smoothly.

Subscriber units compatible with the present invention and thus capable of supporting a slotted ALOHA scheme can achieve improved throughput performance in systems having base stations that also support a slotted ALOHA scheme. If a substantial percentage of the subscriber units in the system support the present invention, the incompatible subscriber units will realize an improved performance because transmissions made by the compatible subscriber units create more unused time available during the times when DSMA transmission is required.

In the pACT system as defined by the pACT Specification, the time slot intervals are defined in multiples of eight blocks. Each block contains seven equal duration microslots. Slotted ALOHA messages can thus be defined as having a length that is a factor of fifty-six microslots. For example, messages of two, four, seven or eight microslots could be used. (Only one length can be chosen, however.) The default for the current pACT system is to have a repetition rate for the time slotting of 576 blocks. In a system with three forward frequency channels, there will typically be four different time slots in each repetition cycle of the time slots. These do not have to be equal in duration, but for this example, it is assumed that they are equal in duration. In this case, the forward frequency channel transmitted by a base station is active for 144 blocks and is inactive for 432 blocks. If there are four microslots per ALOHA slot, then there are 432*7/4=756 ALOHA slots in the inactive period.

The simplest way for a base station to indicate the decode status of each of these blocks is to send a special data frame near the beginning of each forward link transmission. The information field of this frame would contain 756 bits, one for each ALOHA slot. If the $n^{th}$ bit of this information field is set to 1, this indicates that a message was successfully received in the $n^{th}$ aloha slot, whereas a 0 indicates no message reception. Data frames in the existing pACT system contain an address field of 4 bytes, followed by a command field of 2 bytes, followed by an information field of up to 130 bytes. An individual subscriber device can not be assigned a 4 byte address in which all bits are set to zero. Thus, this address can be used to indicate that the information field that follows contains decode status information for ALOHA slots. Subscriber devices that do not have the ALOHA capability will ignore the message because the address does not match their address. In some cases there may be too many ALOHA slots to fit the decode status information for all of them in a 130 byte information field (1040). In this case, two or more frames can be sent.

The format of the ALOHA slot messages can be different from DSMA messages. Because the base station does not have to detect the presence of the slotted ALOHA messages as rapidly as it must for DSMA messages (in order to set the busy flag), it is not necessary for the slotted ALOHA messages to include complex preamble sequences. If the system is designed so that slotted ALOHA messages are used primarily to support acknowledgment traffic then these messages can be made to be shorter than DSMA messages. In the preferred embodiment of this invention, the ALOHA slot would have a length equal to 4 of the DSMA microslots, or 240 bit times. The bit assignments in the time slot therefore preferably are as shown in the following table:

| Bit positions | Number of bits | Purpose |
| --- | --- | --- |
| 0–1 | 2 | Guard time to allow for variation in subscriber device timing and propagation delay. |
| 2–4 | 3 | Ramp-up period for the power amplifier to reach full power and for the modulation to start up. |
| 5–16 | 12 | Sync word preamble for base station to determine block timing. |
| 17–128 | 112 | 14 byte information data field |
| 129–224 | 96 | Parity for FEC coding computed using a shortened (63,47) Reed Solomon code over the 112 bit information data field. |
| 225–236 | 12 | Sync word postamble for base station to determine block timing. |
| 237–239 | 3 | Ramp-down period for the power amplifier and modulation tail off. |

The subscriber unit can transmit any message requiring a link layer content of 14 bytes or less using a single ALOHA slot. This is adequate for most control messages and acknowledgments used in the system. All of the modifications described above can readily be implemented via software changes in existing base stations and subscriber units. These modifications are obvious to one of ordinary skill in the art.

When a subscriber device transmits a slotted ALOHA message which is not received by the base station, the base station will subsequently transmit a decode status message to indicate that the last subscriber device transmission was unsuccessful. The subscriber device will then retransmit the message using either DSMA-CD (during active forward channel periods) or slotted ALOHA (during inactive periods) as described hereinabove.

In the preferred embodiment, a control scheme provides for allocation of the time slots and handling certain problems with subscriber unit handoffs between cells. In the preferred embodiment, each cell and each subscriber unit maintains three timers, synchronized to a common time standard. A Cycle timer counts cyclically through a period of time defining an entire time slot cycle (i.e., transmit enabled/transmit disabled). A TimeSlotBegin timer begins counting when the Cycle timer cycles through zero, and then counts to a pre-set value, at which a cell begins transmitting. A TimeSlotEnd timer begins counting when the cell begins transmitting, and then counts to a pre-set value, at which the cell ceases transmitting. The pre-set value for each timer is preferably part of the configuration information for a cell, but may be dynamically changed in response to cell usage, as described above.

Once configured, each cell base station generates time signals in known fashion, and thus determines when to transmit. Each cell base station transmits the pre-set values for all three timers in control messages that also include other parameters used to control subscriber units, in known fashion. In the preferred embodiment, the timer control messages are transmitted at well-defined intervals so that subscriber units can easily acquire the information. More particularly, two control messages are used in the preferred embodiment, a ChannelID message and a CellConfig message.

Immediately before expiration of the TimeSlotEnd timer, a ChannelID message is sent which provides information about the channel on which the message is being transmitted. The ChannelID message contains (among other things) a Time of Day (TOD) value and the pre-set values for the Cycle timer, the TimeSlotBegin timer, and the TimeSlotEnd timer. When a subscriber unit begins to acquire a base station signal, it searches in known fashion for a channel with a signal good enough to be reliably received. The subscriber unit then monitors the data on that channel until the subscriber unit receives a ChannelID message. The subscriber unit is programmed to know that the ChannelID message it has received is near or (preferably) in the last block of data being transmitted by the cell using that channel. The subscriber unit uses the timer information in the ChannelID message to establish a time reference that indicates when the next active transmission by that cell will occur. Accordingly, the subscriber unit can synchronize with and track the time slot transmissions of a cell. However, other means may be used to synchronize subscriber units to cell base stations if desired.

The CellConfig message provides information needed to accommodate transitions between cells by a subscriber unit. Since neighboring cells use different frequencies, are active in different time slots, and may have a different Cycle timer value and thus have transmit times that are not synchronous with the currently selected base station, such information needs to be transmitted to each subscriber unit. Accordingly, a CellConfig message from a cell contains a list of all frequencies used by neighboring cells, as well as the pre-set values for the Cycle timer, the TimeSlotBegin timer, and the TimeSlotEnd timer associated with each such frequency (these values may differ from the corresponding values for the frequency used by the current cell). In the preferred embodiment, each CellConfig message is transmitted at or near the start of the active transmission period for each cell. When a subscriber unit is acquiring and has received its first ChannelID message on a particular channel, the subscriber unit then waits until the transmitting base station begins to transmit again (as determined from the timer values in the ChannelID message). The subscriber unit then extracts the CellConfig message transmitted in the next transmission time slot.

The subscriber unit can use the TOD and timer values in a received CellConfig message to determine when each neighbor cell will be active, which allows the subscriber unit to monitor or scan such neighbor cells from time to time as they become active on the frequencies indicated in the CellConfig message. When a scan is performed, and a subscriber unit has evaluated every indicated neighbor cell's channel (each cell has a dedicated channel), the subscriber unit chooses the best cell base station, in known fashion, and can transmit packets and commence registering and communicating with the cellular network through the new cell.

By putting the ChannelID message at the end of a transmission by a cell during its active time slot, and the CellConfig message at the beginning of a transmission by a cell during its next active time slot, the present invention reduces the time required for a subscriber unit to obtain the information necessary to synchronize with a cell and evaluate other cell channels.

The inventive system may be implemented in hardware or software, or a combination of both. In particular, the generation of time and timer values, and the generation, transmission, and use of ChannelID messages and CellConfig messages may be implemented in computer programs executing on programmable processors in the base stations and subscriber units of a cellular system. Each computer program is preferably stored on a storage media or device (e.g., ROM or magnetic diskette) readable by a general or special purpose computer, for configuring and operating the computer when the storage media or device is read by the computer to perform the protocol described above. The inventive protocol may also be considered to be implemented as a computer-readable storage medium, configured with a computer program, where the storage medium so configured causes a computer to operate in a specific and predefined manner to perform the protocol described above.

In summary, the invention includes a method for reusing frequencies in a cellular communication system by allocating identical frequencies to neighboring cells in a cellular system within significant co-channel interference range of each other, and periodically enabling each such neighboring cell to transmit at least in part only during a time period in which no other of such neighboring cells is activated.

The invention may also be thought of as a way of providing more (or "virtual") channels in a cellular system. In this way of thinking, a channel is designated by both its timing and its carrier frequency. Thus, time slotting allows more channels than a system with frequencies only. More channels allows sparser reuse patterns and thus less co-channel interference.

Alternative embodiments of the present invention described hereinabove provide methods and apparatus which produce significant data throughput improvements on the reverse channels of NPCS systems. The data throughput improvements range between 50% and 150%. Increased data throughput provides more efficient use of frequency spectrum, the most expensive resource in paging systems. The throughput improvements enable data intensive reverse link applications that cannot be used with existing systems. For example, one of the proposed capabilities of an NPCS subscriber device is the ability to originate data transmissions such as E-mail and other messaging information. This capability can be used in telemetry applications. However, this capability may require far greater bandwidth on the reverse link than is currently available using existing paging systems. Therefore, the present invention facilitates telemetry and other data-intensive applications by improving throughput performance. The cost associated with this performance improvement is nominal.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

What is claimed is:

1. A method of reusing reverse frequency channels in a cellular communication system having a plurality of cells arranged as a plurality of frequency reuse groups, each reuse group comprising a plurality of associated corresponding time-slotted cell subsets comprising a plurality of associated corresponding cells, each cell in an associated subset assigned an identical forward frequency channel which is unique to the subset within the reuse group corresponding to the subset, the method comprising:

(a) periodically enabling a broadcast in each cell of a first subset to normally transmit data on its assigned forward frequency channel at least in part only during a time period in which no other cell in the first subset is so enabled; and (b) during periods when it would normally receive data on a reverse link, enabling a broadcast in each cell of a second subset to transmit data on a predetermined reverse frequency channel during the time period that each cell of the first subset is normally enabled to transmit on its assigned forward frequency channel such that the reverse frequency channel is used by different cells for forward data transmission to increase data bandwidth from base stations to subscriber units in a cellular communication system, wherein a channel access scheme is used to arbitrate access by different cells to the reverse frequency channel.

2. The method of claim 1, wherein the cellular communication system is asymmetrical.

3. The method of claim 1, wherein the cellular communication system is an asymmetrical narrowband Personal Communications System (NPCS) system.

4. The method of claim 3, wherein a reuse group has three forward frequency channels for every one reverse frequency channel.

5. The method of claim 4, wherein the forward frequency channels comprise 50 kHz segments, and the reverse frequency channels comprise 12.5 kHz segments.

6. The method of claim 1, wherein the time period during which each cell is enabled to transmit on an identical frequency has the same duration for all selected cells.

7. The method of claim 1, wherein the time period during which each cell is enabled to transmit on an identical frequency has a different duration from at least some selected cells.

8. The method of claim 1, wherein the time period during which each cell is enabled to transmit on an identical frequency does not overlap any time period during which any other cell is enabled to transmit on such identical frequency.

9. The method of claim 1, wherein the time period during which each cell is enabled is a function of relative usage of each cell.

10. A method of reusing reverse frequency channels in a cellular communication system having a plurality of reverse frequency channels and a plurality of forward frequency channels, the cellular communication system further having a plurality of cells arranged as a plurality of cell groups, each cell group comprising a plurality of associated corresponding time-slotted cell subsets comprising a plurality of associated corresponding cells, each cell in an associated subset assigned one identical forward frequency channel of the plurality of frequency channels which is unique to the cell subset within the cell group, wherein each cell of a corresponding subset is periodically enabled to transmit on its assigned forward frequency channel at least in part only during a time period in which no other cell in the corresponding subset is enabled, comprising:

(a) assigning an associated reverse frequency channel to each cell subset in a selected cell group, wherein the associated reverse frequency channel corresponds to the forward frequency channel assigned to another cell subset, and (b) during periods when it would normally receive data on a reverse link, enabling a broadcast in each cell of a corresponding cell subset in the selected cell group to transmit on its assigned reverse frequency channel such that the assigned reverse frequency channel is used by different cells for data transmission to increase data bandwidth between base stations and subscriber units in a cellular communication system, wherein a channel access scheme is used to arbitrate access by different cells to the reverse frequency channel.

11. The method of claim 10, wherein the channel access scheme is slotted ALOHA.

12. The method of claim 10, wherein a Digital Sense Multiplication Access with Collision Detection (DSMA-CD) channel access scheme is used during the time period that each cell is enabled to transmit on its assigned forward frequency channel, and wherein a slotted ALOHA channel access scheme is used when each cell is inactive.

13. The method of claim 10, wherein the cellular communication system is symmetrical.

14. The method of claim 13, wherein the channel access scheme is slotted ALOHA.

15. The method of claim 13, wherein a Digital Sense Multiplication Access with Collision Detection (DSMA-CD) channel access scheme is used during the time period that each cell is enabled to transmit on its assigned forward frequency channel, and wherein a slotted ALOHA channel access scheme is used when each cell is inactive.

* * * * *